(12) United States Patent
Zhang et al.

(10) Patent No.: US 11,461,549 B2
(45) Date of Patent: Oct. 4, 2022

(54) METHOD AND APPARATUS FOR GENERATING TEXT BASED ON SEMANTIC REPRESENTATION, AND MEDIUM

(71) Applicant: BEIJING BAIDU NETCOM SCIENCE AND TECHNOLOGY CO., LTD., Beijing (CN)

(72) Inventors: Han Zhang, Beijing (CN); Dongling Xiao, Beijing (CN); Yukun Li, Beijing (CN); Yu Sun, Beijing (CN); Hao Tian, Beijing (CN); Hua Wu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 190 days.

(21) Appl. No.: 16/988,907

(22) Filed: Aug. 10, 2020

(65) Prior Publication Data

US 2021/0232765 A1   Jul. 29, 2021

(30) Foreign Application Priority Data

Jan. 23, 2020   (CN) .......................... 202010076485.8

(51) Int. Cl.
*G06F 40/274* (2020.01)
*G06F 40/56* (2020.01)
(Continued)

(52) U.S. Cl.
CPC ............ *G06F 40/274* (2020.01); *G06F 40/30* (2020.01); *G06F 40/56* (2020.01); *G06K 9/6256* (2013.01)

(58) Field of Classification Search
None
See application file for complete search history.

(56) References Cited

U.S. PATENT DOCUMENTS 10,019,438 B2   7/2018   Audhkhasi et al.
10,108,610 B1 * 10/2018   Pierard .................. G06F 40/58
(Continued)

FOREIGN PATENT DOCUMENTS

| CN | 108984524 | | 12/2018 |
|---|---|---|---|
| CN | 109871529 | A | 6/2019 |
| CN | 110457718 | | 11/2019 |

OTHER PUBLICATIONS

Wu, Xing, et al. "Conditional bertcontextual augmentation." International Conference on Computational Science. Springer, Cham, 2019. (Year: 2019).*
(Continued)

*Primary Examiner* — Douglas Godbold
(74) *Attorney, Agent, or Firm* — Frost Brown Todd LLC (57) ABSTRACT

The present disclosure discloses a method and an apparatus for generating a text based on a semantic representation and relates to a field of natural language processing (NLP) technologies. The method for generating the text includes: obtaining an input text, the input text comprising a source text; obtaining a placeholder of an $i^{th}$ word to be predicted in a target text; obtaining a vector representation of the $i^{th}$ word to be predicted, in which the vector representation of the $i^{th}$ word to be predicted is obtained by calculating the placeholder of the $i^{th}$ word to be predicted, the source text and $1^{st}$ to $(i-1)^{th}$ predicted words by employing a self-attention mechanism; and generating an $i^{th}$ predicted word based on the vector representation of the $i^{th}$ word to be predicted, to obtain a target text.

15 Claims, 3 Drawing Sheets

(51) Int. Cl.
  *G06F 40/30* (2020.01)
  *G06K 9/62* (2022.01)

(56) References Cited

U.S. PATENT DOCUMENTS

| | | | | |
|---|---|---|---|---|
| 2008/0262828 | A1* | 10/2008 | Och | G06F 40/44 704/3 |
| 2016/0275070 | A1* | 9/2016 | Corston | G06F 40/253 |
| 2017/0270100 | A1* | 9/2017 | Audhkhasi | G06F 40/30 |
| 2019/0147355 | A1 | 5/2019 | Rennie et al. | |
| 2019/0179908 | A1* | 6/2019 | Nakao | G06F 40/51 |
| 2019/0355270 | A1 | 11/2019 | McCann et al. | |
| 2021/0149996 | A1* | 5/2021 | Bellegarda | G06F 3/016 |
| 2021/0342540 | A1* | 11/2021 | Firat | G06F 16/353 |

OTHER PUBLICATIONS

Clinchant, Stephane, Kweon Woo Jung, and Vassilina Nikoulina. "On the use of BERT for neural machine translation." arXiv preprint arXiv:1909.12744 (2019). (Year: 2019).*

Wang, Alex, and Kyunghyun Cho. "Bert has a mouth, and it must speak: Bert as a markov random field language model." arXiv preprint arXiv:1902.04094 (2019). (Year: 2019).*

Devlin, Jacob, et al. "Bert: Pre-training of deep bidirectional transformers for language understanding." arXiv preprint arXiv:1810.04805 (2018). (Year: 2018).*

Chinese Office Action dated Jul. 30, 2020 for Application No. 202010076485.8, 12 pages.

European Extended Search Report dated Jun. 15, 2021 for Application No. 20216376.2, 7 pages.

Alammar, Jay, "The Illustrated GPT-2 (Visualizing Transformer Language Models)" Internet; 2019; search performed Dec. 7, 2021; https://web.archive.org/web/20190812070114/https://jalammar.github.io/illustrated-gpt2/, 34 pages.

Radford, Alec et al., "Improving Language Understanding by Generative Pre-Training" Internet; Jun. 11, 2018; search performed Dec. 7, 2021; https://cdn.openai.com/research-covers/language-unsupervised/language_understanding_paper.pdf, 12 pages.

Radford, Alec et al., "Language Models are Unsupervised Multitask Learners"; Internet Feb. 14, 2019; search performed Dec. 7, 2021; https://d4mucfpksywv.cloudfront.net/better-language-models/language-models.pdf, pp. 1-24.

Japanese Office Action dated Dec. 14, 2021 for Application No. 2020-208905, 8 pages.

* cited by examiner

METHOD AND APPARATUS FOR GENERATING TEXT BASED ON SEMANTIC REPRESENTATION, AND MEDIUM

CROSS-REFERENCE TO RELATED APPLICATION

The present application is based upon and claims priority to Chinese Patent Application No. 202010076485.8, filed on Jan. 23, 2020, the entirety contents of which are incorporated herein by reference.

FIELD

The present disclosure relates to a field of computer technologies, particularly to a field of natural language processing (NLP) technologies, and more particularly to a method and an apparatus for generating a text based on a semantic representation, and a storage medium.

BACKGROUND

In a field of natural language processing technologies, a conventional generation task usually uses a previous predicted word to predict a following word. For example, a following word t2 is predicted by utilizing t1, and a following word t3 is predicted by utilizing t2. However, when an error appears in t1 during decoding and t2 is predicted based on t1 decoded incorrectly, it may lead to further propagation of the error, that is, exposure deviation and low decoding accuracy.

SUMMARY

The present disclosure provides a method and an apparatus for generating a text based on a semantic representation, to solve problems that an existing method has exposure deviation and low decoding accuracy in the related art.

Embodiments of the present disclosure provide a method for generating a text based on a semantic representation. The method includes: obtaining an input text, the input text comprising a source text; obtaining a placeholder of an $i^{th}$ word to be predicted in a target text, i representing a positive integer; obtaining a vector representation of the $i^{th}$ word to be predicted, in which the vector representation of the $i^{th}$ word to be predicted is obtained by calculating the placeholder of the $i^{th}$ word to be predicted, the source text and $1^{st}$ to $(i-1)^{th}$ predicted words by employing a self-attention mechanism; and generating an $i^{th}$ predicted word based on the vector representation of the $i^{th}$ word to be predicted, to obtain a target text.

Embodiments of the present disclosure provide an apparatus for generating a text based on a semantic representation. The apparatus includes: one or more processors; a memory storing instructions executable by the one or more processors; in which the one or more processors are configured to: obtain an input text, the input text including a source text; obtain a placeholder of an $i^{th}$ word to be predicted in a target text, i representing a positive integer; obtain a vector representation of the $i^{th}$ word to be predicted, wherein the vector representation of the $i^{th}$ word to be predicted is obtained by calculating the placeholder of the $i^{th}$ word to be predicted, the source text and $1^{st}$ to $i-1^{th}$ predicted words by employing a self-attention mechanism; and generate an $i^{th}$ predicted word based on the vector representation of the $i^{th}$ word to be predicted, to obtain a target text.

Embodiments of the present disclosure provides a non-transitory computer readable storage medium having computer instructions stored thereon. A method for generating a text based on a semantic representation is implemented when the computer instructions are executed by a computer. The method includes: obtaining an input text, the input text comprising a source text; obtaining a placeholder of an $i^{th}$ word to be predicted in a target text, i representing a positive integer; obtaining a vector representation of the $i^{th}$ word to be predicted, in which the vector representation of the $i^{th}$ word to be predicted is obtained by calculating the placeholder of the $i^{th}$ word to be predicted, the source text and $1^{st}$ to $(i-1)^{th}$ predicted words by employing a self-attention mechanism; and generating an $i^{th}$ predicted word based on the vector representation of the $i^{th}$ word to be predicted, to obtain a target text.

Other effects achieved by the above alternative methods will be described below with reference to detailed embodiments.

BRIEF DESCRIPTION OF THE DRAWINGS

The accompanying drawings are used for better understanding the solution and do not constitute a limitation of the present disclosure.

DETAILED DESCRIPTION

Description will be made below to exemplary embodiments of the present disclosure with reference to accompanying drawings, including various details of embodiments of the present disclosure to facilitate understanding, which should be regarded as merely exemplary. Therefore, it should be recognized by the skilled in the art that various changes and modifications may be made to the embodiments described herein without departing from the scope and spirit of the present disclosure. Meanwhile, for clarity and conciseness, descriptions for well-known functions and structures are omitted in the following description.

Description will be made below to a method and an apparatus for generating a text based on a semantic representation according to embodiments of the present disclosure with reference to accompanying drawings.

For problems such as exposure deviation and low prediction accuracy in an existing prediction method, embodiments of the present disclosure provide a method for generating a text based on a semantic representation.

With the method for generating the text based on the semantic representation according to embodiments of the present disclosure, a source text and one or more current predicted words are merged by introducing a placeholder to obtain a vector representation corresponding to a current word to be predicted. The current word to be predicted is predicted based on the vector representation. Even if a previous predicted word is wrong during decoding, there is relatively small influence on the vector representation corresponding to the placeholder of the current word to be predicted, thereby alleviating the exposure deviation and improving the decoding accuracy to a certain extent.

Figure 1:
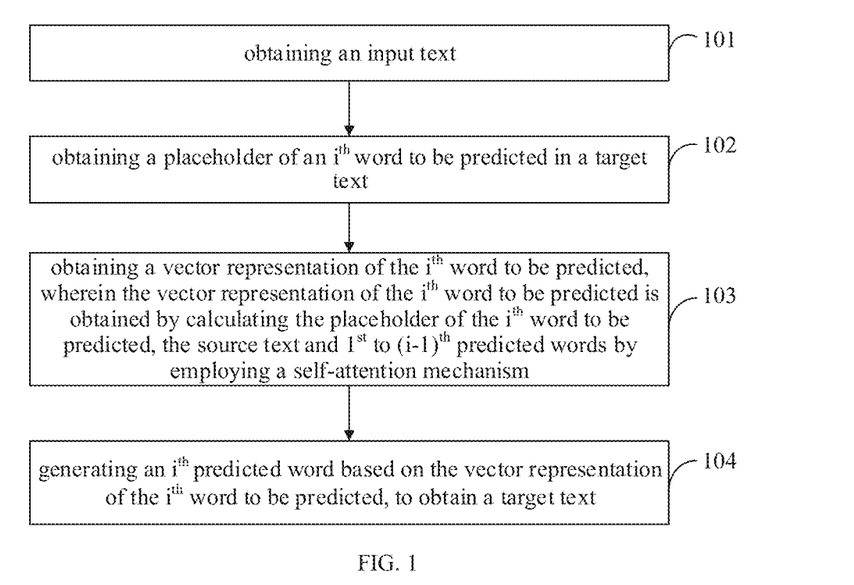
FIG. 1 is a flow chart illustrating a method for generating a text based on a semantic representation according to an embodiment of the present disclosure.

FIG. 1 is a flow chart illustrating a method for generating a text based on a semantic representation according to an embodiment of the present disclosure.

The method for generating the text based on the semantic representation according to an embodiment of the present disclosure may be executed by an apparatus for generating a text based on a semantic representation according to an embodiment of the present disclosure. The apparatus may be configured in an electronic device to implement merging the source text and the one or more current predicted words by introducing the placeholder, thereby obtaining the vector representation corresponding to the current word to be predicted and predicting the current word to be predicted.

As illustrated in FIG. 1, the method for generating the text based on the semantic representation includes the following.

At block 101, an input text is obtained. The input text includes a source text.

In this embodiment, the source text refers to a text for predicting. After the input text is obtained, the source text included in the input text may be converted into a vector, to obtain a vector representation corresponding to the source text.

At block 102, a placeholder of an $i^{th}$ word to be predicted in a target text is obtained.

The target text is a text corresponding to the source text and obtained by prediction. In this embodiment, a placeholder is introduced into each word to be predicted. The placeholder may be regarded as a marker.

At block 103, a vector representation of the $i^{th}$ word to be predicted is obtained. The vector representation of the $i^{th}$ word to be predicted is obtained by calculating the placeholder of the $i^{th}$ word to be predicted, the source text and $1^{st}$ to $(i-1)^{th}$ predicted words by employing a self-attention mechanism.

In this embodiment, the placeholder corresponding to the $i^{th}$ word to be predicted, the source text and the $1^{st}$ to $(i-1)^{th}$ predicted words are input into a self-attention unit in a model. At this time, the placeholder is recognized, the source text and the $1^{st}$ to $(i-1)^{th}$ predicted words are calculated by the self-attention mechanism, to obtain the vector representation of the $i^{th}$ word to be predicted. The calculation here may be weighted summation, and weights may be preset.

In other words, in this embodiment, by introducing the placeholder, the source text and one or more predicted words are calculated by the self-attention mechanism to obtain the vector representation corresponding to the current word to be predicted.

It should be noted that, vectors corresponding to the source text and the $1^{st}$ to $(i-1)^{th}$ predicted words are used when the calculation is performed by employing the self-attention mechanism.

At block 104, an $i^{th}$ predicted word is generated based on the vector representation of the $i^{th}$ word to be predicted, to obtain a target text.

After the vector representation of the $i^{th}$ word to be predicted is obtained, the vector representation may be decoded to obtain the $i^{th}$ predicted word, that is, prediction for the $i^{th}$ word to be predicted is completed. In this embodiment, the target text may be generated based on the $1^{st}$ to $i^{th}$ predicted words. Of course, when there are still predicted words after the $i^{th}$ predicted word, the target text is generated based on all the predicted words.

In the present disclosure, the current word to be predicted is predicted by the placeholder based on the source text and previous text information. Even if there is an error in the predicted previous word during decoding, a prediction result of a following word to be predicted may not be directly affected. Compared with directly performing the prediction based on the predicted word before the word to be predicted in the related art, the present disclosure may alleviate the exposure deviation and improve the decoding accuracy to a certain extent.

It should be noted that, in this embodiment, the $1^{st}$ predicted word is predicted based on the source text.

With the method for generating the text based on the semantic representation according to embodiments of the present disclosure, the input text is obtained, in which the input text includes the source text. The placeholder of the $i^{th}$ word to be predicted in the target text is obtained, in which i represents a positive integer. The vector representation of the $i^{th}$ word to be predicted is obtained, in which the vector representation of the $i^{th}$ word to be predicted is obtained by calculating the placeholder of the $i^{th}$ word to be predicted, the source text and $1^{st}$ to $(i-1)^{th}$ predicted words by employing the self-attention mechanism. The $i^{th}$ predicted word is generated based on the vector representation of the $i^{th}$ word to be predicted, to obtain the target text. In this way, the source text and the one or more current predicted word are merged by introducing the placeholder to obtain the vector representation corresponding to the current word to be predicted. The current word to be predicted is predicted based on the vector representation. Even if the previous predicted word is wrong during decoding, there is relatively small influence on the vector representation corresponding to the placeholder of the current word to be predicted, thereby alleviating the exposure deviation and improving the decoding accuracy to a certain extent.

Figure 2:
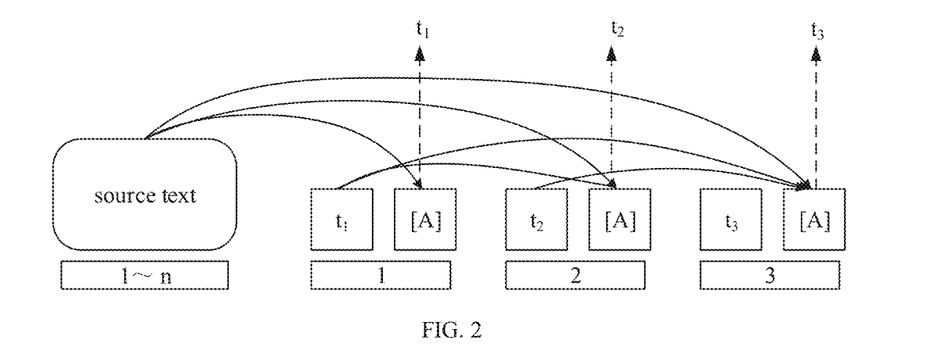
FIG. 2 is a schematic diagram illustrating a procedure for generating a text based on a semantic representation according to an embodiment of the present disclosure.

In order to better describe the above embodiment, description will be made below with reference to FIG. 2. FIG. 2 is a schematic diagram illustrating a prediction procedure based on a semantic representation according to an embodiment of the present disclosure.

As illustrated in FIG. 2, it is assumed that a position code corresponding to the source text is 1~n, that is, there are n words in total, and the vector representation of the first word to be predicted is obtained based on the source text, that is, the prediction is performed based on the source text to generate a first predicted word $t_1$. Then, a vector representation of a second word to be predicted is obtained by calculating a placeholder [A] corresponding to the second word to be predicted, the source text and the first predicted word $t_1$ by the self-attention mechanism, and a second predicted word $t_2$ is generated based on the vector representation of the second word to be predicted. After, a placeholder corresponding to a third word to be predicted, the source text, the first predicted word $t_1$ and the second predicted word $t_2$ are calculated by the self-attention mechanism to obtain a vector representation of the third word to be predicted. When the third word to be predicted is predicted, a third predicted word t₃ is generated based on the vector representation of the obtained third word to be predicted.

Figure 3:
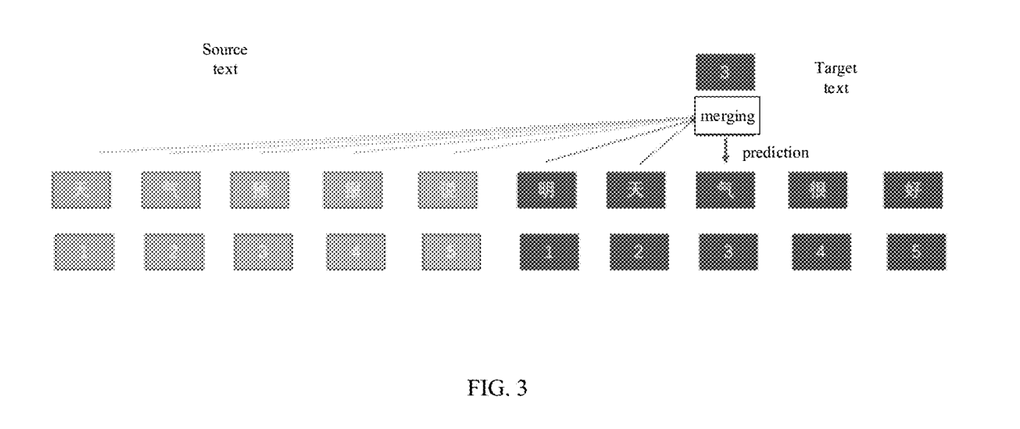
FIG. 3 is a schematic diagram illustrating an example for generating a text based on a semantic representation according to an embodiment of the present disclosure.

FIG. 3 is a schematic diagram illustrating a prediction example based on a semantic representation according to an embodiment of the present disclosure. In FIG. 3, the source text is "大气预报说" (which means that "what does the weather forecast display" in English). Based on the source text, the first predicted word in the target text is "明". Then, through the self-attention mechanism, the second vector representation of the second word to be predicted is obtained by calculating the placeholder corresponding to the second word to be predicted, the source text "大 气预报说" and the first predicted word "明". Then, the second predicted word is predicted as "天" (in which, the Chinese character "明" and the Chinese character "天" are combined to form "明 天", which means "tomorrow" in English) based on the vector representation of the second word to be predicted.

After, the source text "大气预报说", the first predicted word "明" and the second predicted word "天" are calculated by the self-attention mechanism to obtain the vector representation of the third word to be predicted, and the third predicted word "气" (which means "weather" in English) is generated based on the vector representation. Based on the above method, the fourth predicted word is "很" (which means "very" in English), and the fifth predicted word is "好" (which means "good" in English). Therefore, the obtained target text is "明天气很好" (which means that "the weather will be very good tomorrow" in English).

On the basis of the above embodiments, in an embodiment of the present disclosure, in the procedure for predicting the target text, the predicted words may also be replaced.

In detail, one or more of the 1$^{st}$ to (i−1)$^{th}$ predicted words may be replaced. When the replacement is performed, the one or more of the 1$^{st}$ to (i−1)$^{th}$ predicted words may be randomly replaced in a certain probability. Therefore, replacing one or more predicted words with noise in a certain proportion for intensive training may enable the model to have an ability to perceive a wrong word in the previous text.

In a detailed replacement, the one or more of the 1$^{st}$ to (i−1)$^{th}$ predicted words may be replaced based on a semantic word list. In more detail, the one of the 1$^{st}$ to (i−1)$^{th}$ predicted words may be replaced randomly, or replaced by a word with higher co-occurrence probability with the previous predicted word in the semantic word list.

In detail, a word to be replaced is determined from the 1$^{st}$ to (i−1)$^{th}$ predicted words, and then a previous predicted word of the word to be replaced is determined. Then, the word to be replaced is replaced with a word in the semantic word list, in which, a co-occurrence probability of the word in the semantic word list with the previous predicted word of the word to be replaced is higher than a preset probability.

It is assumed that the first to fourth predicted words are replaced in a certain probability. For example, if the third predicted word is selected to be replaced, the third predicted word may be replaced with a word in the semantic word list, in which a co-occurrence probability of the word with the second predicted word is greater than 70%.

In this embodiment, one or more predicted words may be replaced in the prediction procedure.

It should be noted that, the above replacement for the one or more predicted words is only performed during model training, and is not performed during decoding.

In embodiments of the present disclosure, the one or more of the 1$^{st}$ to (i−1)$^{th}$ predicted words are replaced by introducing noise, such that the above word is replaced with noise for intensive training, and a recognition model has the ability to perceive the wrong word in the previous text.

Generally, since there is no data set big enough, and a good model also needs to be used, it is easy to cause over-fitting. Presently, a large number of unsupervised texts may be mainly used to perform self-supervised task generation learning, that is, the procedure is pre-training. Then, parameters of a pre-training model are applied to one's own data set for performing supervised learning, such that the parameters adapt to the data set to obtain a required model, that is, the procedure is fine adjustment.

In order to improve the accuracy of the model, in an embodiment of the present disclosure, the above method for generating the text may be uniformly applied to the pre-training and the fine adjustment. In detail, the parameters of the pre-training model obtained based on the above method for generating the text are taken as initialization parameters of the model during the fine adjustment, and supervised learning is performed based on the above method for generating the text to obtain the required model.

It should be noted that, the above method for generating the text may also be used in the pre-training or the fine adjustment.

In this embodiment of the present disclosure, the above method for generating the text based on the semantic representation is uniformly applied to the pre-training and the fine adjustment, such that exposure deviation may be greatly eliminated and the accuracy of the model may be improved.

In addition, in an actual application, there is an inconsistency between a previous text dependent by the training and a previous text dependent by the decoding, which means exposure deviation. The above method for generating the text in the above embodiments may be applied to both the training and the decoding, that is, prediction is performed based on the model, such that the above method may be uniformly applied to the training and the decoding, and exposure deviation may be greatly eliminated.

On the basis of the above embodiments, in an embodiment of the present disclosure, the target text may have a corresponding marker, and the above method for generating the text may be applied to supervised model training. Description will be made below with reference to FIG. 4.

Figure 4:
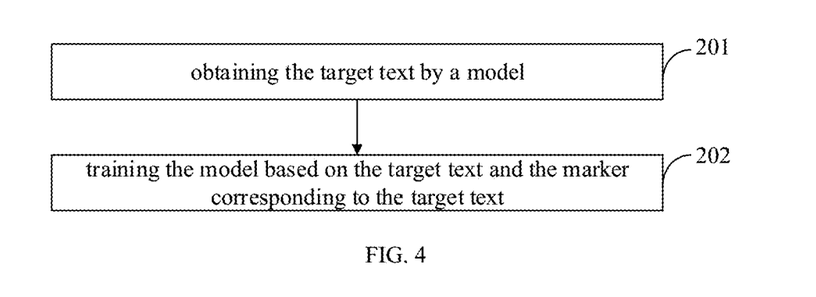
FIG. 4 is a flow chart illustrating a method for generating a text based on a semantic representation according to another embodiment of the present disclosure.

FIG. 4 is a flow chart illustrating a method for generating a text based on a semantic representation according to another embodiment of the present disclosure.

As illustrated in FIG. 4, the method for generating the text based on the semantic representation also includes the following.

At block 201, the target text is obtained by a model.

In this embodiment, the input text includes the source text and a marker corresponding to the target text. The input text is a training sample for training a recognition model. A large number of input texts may be obtained, and each input text includes the source text and the marker corresponding to the target text. The source text is used for prediction, the target text is the text obtained by prediction based on the source text, and the marker of the target text may be a pre-specified text.

When the model is trained, the predicted words may be generated by utilizing the method for generating the text based on the semantic representation in the above embodiments, and then the target text may be obtained. The initialization parameters of the model may be initialized based on a way specified by the network definition, and may also be model parameters obtained by the pre-training.

As the current predicted word are generated above based on the source text and the one or more predicted words, compared with the related art, during the training, the following word is not predicted directly based on the previous predicted word, and even if the previous predicted word is wrong, there is less influence on the vector representation of the current word to be predicted, thereby improving the prediction accuracy.

At block 202, the model is trained based on the target text and the marker corresponding to the target text.

After the target text is obtained, loss may be calculated based on the target text and the marker corresponding to the target text. When the loss does not meet the requirement, the model parameters are adjusted to continue training, and the training is stopped until the requirement is met, to obtain the trained model.

The training method of embodiments of the present disclosure may be applied to directly performing supervised training, and may also be applied to the fine adjustment.

With the method for generating the text based on the semantic representation according to embodiments of the present disclosure, the target text corresponds to the marker, the target text is obtained by the model, and the model is trained based on the target text and the marker corresponding to the target text. In this way, during the training, the source text and the current predicted word are merged by introducing the placeholder to obtain the vector representation corresponding to the current word to be predicted. The current word to be predicted is predicted based on the vector representation. Even if the previous predicted word is wrong during the decoding, there is relatively small influence on the vector representation corresponding to the placeholder of the current word to be predicted, thereby alleviating the exposure deviation and improving the decoding accuracy to a certain extent, and further improving the accuracy of the recognition model.

Figure 5:
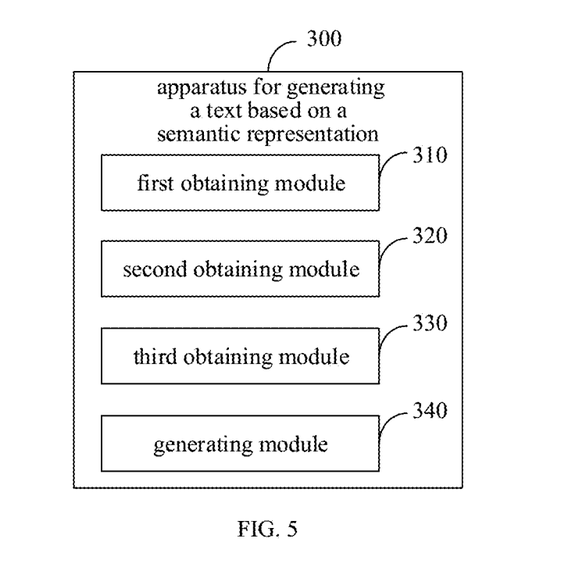
FIG. 5 is a block diagram illustrating an apparatus for generating a text based on a semantic representation according to an embodiment of the present disclosure.

To achieve the above embodiments, embodiments of the present disclosure also provide an apparatus for generating a text based on a semantic representation. FIG. 5 is a block diagram illustrating an apparatus for generating a text based on a semantic representation according to an embodiment of the present disclosure.

As illustrated in FIG. 5, the apparatus 300 for generating the text based on the semantic representation includes: a first obtaining module 310, a second obtaining module 320, a third obtaining module 330, and a generating module 340.

The first obtaining module 310 is configured to obtain an input text. The input text includes a source text. The second obtaining module 320 is configured to obtain a placeholder of an $i^{th}$ word to be predicted in a target text. i represents a positive integer. The third obtaining module 330 is configured to obtain a vector representation of the $i^{th}$ word to be predicted, in which the vector representation of the $i^{th}$ word to be predicted is obtained by calculating the placeholder of the $i^{th}$ word to be predicted, the source text and $1^{st}$ to $i-1^{th}$ predicted words by employing a self-attention mechanism. The generating module 340 is configured to generate an $i^{th}$ predicted word based on the vector representation of the $i^{th}$ word to be predicted, to obtain a target text.

In a possible implementation of embodiments of the present disclosure, the apparatus may also include a replacing module, configured to replace one or more of the $1^{st}$ to $(i-1)^{th}$ predicted words.

In a possible implementation of embodiments of the present disclosure, the replacing module is configured to: replace one or more of the $1^{st}$ to $(i-1)^{th}$ predicted words based on a semantic word list.

In a possible implementation of embodiments of the present disclosure, the replacing module is configured to: determine a word to be replaced from the $1^{st}$ to $(i-1)^{th}$ predicted words; and replace the word to be replaced with a word in the semantic word list, in which, a co-occurrence probability of the word in the semantic word list with a previous predicted word of the word to be replaced is higher than a preset probability.

In a possible implementation of embodiments of the present disclosure, the apparatus is applied to pre-training and fine adjustment.

Figure 6:
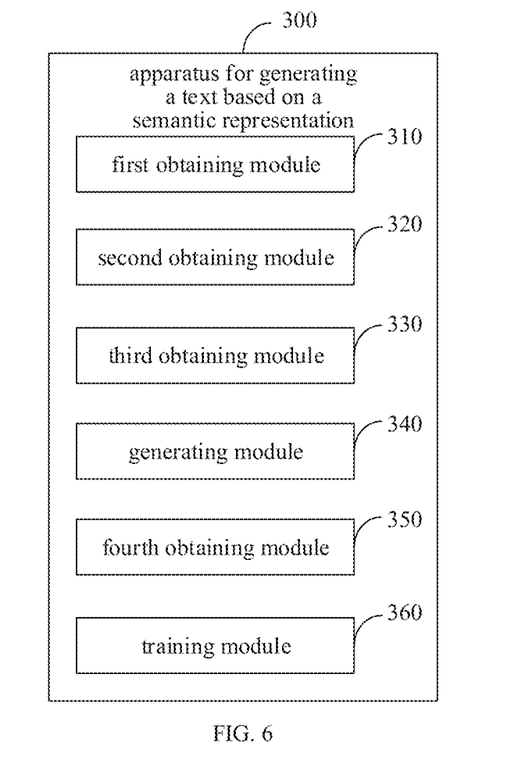
FIG. 6 is a block diagram illustrating an apparatus for generating a text based on a semantic representation according to another embodiment of the present disclosure.

FIG. 6 is a block diagram illustrating an apparatus for generating a text based on a semantic representation according to another embodiment of the present disclosure.

In a possible implementation of embodiments of the present disclosure, the target text corresponds to a marker. As illustrated in FIG. 6, the apparatus may also include: a fourth obtaining module 350 and a training module 360.

The fourth obtaining module 350 is configured to obtain the target text by a model. The training module 360 is configured to train the model based on the target text and the marker corresponding to the target text.

It should be noted that the description for the embodiments of the method for generating the text based on the semantic representation may also be applicable to the apparatus for generating the text based on the semantic representation in this embodiment, which is not elaborated here.

With the apparatus for generating the text based on the semantic representation according to embodiments of the present disclosure, the input text is obtained, in which the input text includes the source text. The placeholder of the $i^{th}$ word to be predicted in the target text is obtained, in which i represents a positive integer. The vector representation of the $i^{th}$ word to be predicted is obtained, in which the vector representation of the $i^{th}$ word to be predicted is obtained by calculating the placeholder of the $i^{th}$ word to be predicted, the source text and $1^{st}$ to $(i-1)^{th}$ predicted words by employing the self-attention mechanism. The $i^{th}$ predicted word is generated based on the vector representation of the $i^{th}$ word to be predicted, to obtain the target text. In this way, the source text and the current predicted word are merged by introducing the placeholder, to obtain the vector representation corresponding to the current word to be predicted. The current word to be predicted is predicted based on the vector representation. Even if the previous predicted word is wrong during the decoding, there is relatively small influence on the vector representation corresponding to the placeholder of the current word to be predicted, thereby alleviating the exposure deviation and improving the decoding accuracy to a certain extent.

According to embodiments of the present disclosure, the present disclosure also provides an electronic device and a readable storage medium.

Figure 7:
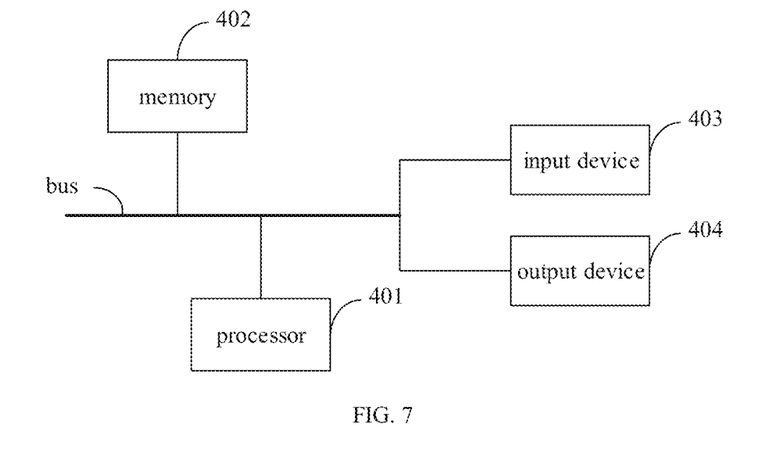
FIG. 7 is a block diagram illustrating an electronic device capable of implementing a method for generating a text based on a semantic representation according to an embodiment of the present disclosure.

As illustrated in FIG. 7, FIG. 7 is a block diagram illustrating an electronic device capable of implementing a method for generating a text based on a semantic representation according to an embodiment of the present disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components illustrated herein, connections and relationships of the components, and functions of the components are merely examples, and are not intended to limit the implementation of the present disclosure described and/or claimed herein.

As illustrated in FIG. 7, the electronic device includes: one or more processors 401, a memory 402, and interfaces for connecting various components, including a high-speed interface and a low-speed interface. Various components are connected to each other by different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, a plurality of processors and/or a plurality of buses may be used together with a plurality of memories if desired. Similarly, a plurality of electronic devices may be connected, and each device provides some necessary operations (for example, as a server array, a group of blade servers, or a multiprocessor system). In FIG. 7, a processor 401 is taken as an example.

The memory 402 is a non-transitory computer readable storage medium provided by the present disclosure. The memory is configured to store instructions executable by at least one processor, to enable the at least one processor to execute a method for generating a text based on a semantic representation provided by the present disclosure. The non-transitory computer readable storage medium provided by the present disclosure is configured to store computer instructions. The computer instructions are configured to enable a computer to execute the method for generating the text based on the semantic representation provided by the present disclosure.

As the non-transitory computer readable storage medium, the memory 402 may be configured to store non-transitory software programs, non-transitory computer executable programs and modules, such as program instructions/modules (such as, the first obtaining module 310, the second obtaining module 320, the third obtaining module 330 and the generating module 340 illustrated in FIG. 5) corresponding to the method for generating the text based on the semantic representation according to embodiments of the present disclosure. The processor 401 executes various functional applications and data processing of the server by operating non-transitory software programs, instructions and modules stored in the memory 402, that is, implements the method for generating the text based on the semantic representation according to the above method embodiment.

The memory 402 may include a storage program region and a storage data region. The storage program region may store an application required by an operating system and at least one function. The storage data region may store data created according to predicted usage of the electronic device based on the semantic representation. In addition, the memory 402 may include a high-speed random access memory, and may also include a non-transitory memory, such as at least one disk memory device, a flash memory device, or other non-transitory solid-state memory device. In some embodiments, the memory 402 may optionally include memories remotely located to the processor 401, and these remote memories may be connected to the electronic device capable of implementing the method for generating the text based on the semantic representation through a network. Examples of the above network include, but are not limited to, an Internet, an intranet, a local area network, a mobile communication network and combinations thereof.

The electronic device capable of implementing the method for generating the text based on the semantic representation may also include: an input apparatus 403 and an output device 404. The processor 401, the memory 402, the input device 403, and the output device 404 may be connected through a bus or in other means. In FIG. 7, the bus is taken as an example.

The input device 403 may receive inputted digital or character information, and generate key signal input related to user setting and function control of the electronic device capable of implementing the method for generating the text based on the semantic representation, such as a touch screen, a keypad, a mouse, a track pad, a touch pad, an indicator stick, one or more mouse buttons, a trackball, a joystick and other input device. The output device 404 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal configured to provide the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact through the communication network. A relationship between client and server is generated by computer programs operated on a corresponding computer and having a client-server relationship with each other.

With the technical solution according to embodiments of the present disclosure, a source text and one or more current predicted words are merged by introducing a placeholder, to obtain a vector representation corresponding to a current word to be predicted. The current word to be predicted is predicted based on the vector representation. Even if a previous predicted word is wrong during decoding, there is relatively small influence on the vector representation corresponding to the placeholder of the current word to be predicted, thereby alleviating the exposure deviation and improving the decoding accuracy to a certain extent. The method may be applied to pre-training and fine adjustment, and may improve the accuracy of the model.

In the description of the present disclosure, terms such as "first" and "second" are used for purposes of description and are not understood to indicate or imply relative importance or implicitly indicate the number of indicated technical features. Therefore, the features defined with "first" and "second" may explicitly or implicitly include at least one of the indicated technical features. In the description of the present disclosure, the term "a plurality of" means at least two, such as two, three, etc., unless otherwise specifically defined.

Although embodiments of the present disclosure have been shown and described above. It should be understood that, the above embodiments are exemplary, and may not be construed to limit the present disclosure. The skilled in the art may make changes, modifications, substitutions and variations in the above embodiments within the scope of the present disclosure.

What is claimed is:

1. A method for generating a text based on a semantic representation, comprising:
    obtaining an input text, the input text comprising a source text;
    obtaining a placeholder of an $i^{th}$ word to be predicted in a target text, i representing a positive integer and the placeholder being a marker;
    obtaining a vector representation of the $i^{th}$ word to be predicted, wherein the vector representation of the $i^{th}$ Word to be predicted is obtained by inputting the placeholder of the $i^{th}$ word to be predicted, the source text and $1^{st}$ to $(i-1)^{th}$ predicted words into a self-attention unit in a model; and
    generating an $i^{th}$ predicted word based on the vector representation of the $i^{th}$ word to be predicted, to obtain a target text;

wherein the method further comprises:
    determining a word to be replaced from the $1^{st}$ to the $(i-1)^{th}$ predicted words; and
    replacing the word to be replaced with a word in the semantic word list, in which, a co-occurrence probability of the word in the sematic word list with a previous predicted word of the word to be replaced is higher than a present probability.

2. The method of claim 1, further comprising:
    replacing one or more of the $1^{st}$ to $(i-1)^{th}$ predicted words.

3. The method of claim 2, wherein replacing one or more of the $1^{st}$ to $(i-1)^{th}$ predicted words comprises:
    replacing one or more of the $1^{st}$ to $(i-1)^{th}$ predicted words based on a semantic word list.

4. The method of claim 1, wherein parameters of a pre-training model are obtained based on the method for generating the text, and the parameters are taken as initialization parameters of the pre-training model during fine adjustment.

5. The method of claim 1, wherein the target text is composed of the $1^{st}$ to $i^{th}$ predicted words and has a marker being a pre-specified text, and the method further comprises:
    obtaining the target text by the model; and
    training the model based on the target text and the marker of the target text.

6. An apparatus for generating a text based on a semantic representation, comprising:
    one or more processors;
    a memory storing instructions executable by the one or more processors;
    wherein the one or more processors are configured to:
    obtain an input text, the input text comprising a source text;
    obtain a placeholder of an $i^{th}$ word to be predicted in a target text, i representing a positive integer and the placeholder being a marker;
    obtain a vector representation of the $i^{th}$ word to be predicted, wherein the vector representation of the $i^{th}$ word to be predicted is obtained by inputting the placeholder of the $i^{th}$ word to be predicted, the source text and $1^{st}$ to $i-1^{th}$ predicted words by employing into a self-attention unit in a model; and
    generate an $1^{th}$ predicted word based on the vector representation of the $i^{th}$ word to be predicted, to obtain a target text;
    wherein the method further comprises
    determining a word to be replaced from the $1^{st}$ to the $(i-1)^{th}$ predicted words; and
    replacing the word to be replaced with a word in the semantic word list, in which, a co-occurrence probability of the word in the semantic word list with a previous predicted word of the word to be replaced is higher than a preset probability.

7. The apparatus of claim 6, wherein the one or more processor are configured to:
    replace one or more of the $1^{st}$ to $(i-1)^{th}$ predicted words.

8. The apparatus of claim 7, wherein the one or more processor are configured to:
    replace one or more of the $1^{st}$ to $(i-1)^{th}$ predicted words based on a semantic word list.

9. The apparatus of claim 6, wherein parameters of a pre-training model are obtained based on the apparatus for generating the text, and the parameters are taken as initialization parameters of the pre-training model during fine adjustment.

10. The apparatus of claim 6, wherein the target text is composed of the $1^{st}$ to $i^{th}$ predicted words and has a marker being a pre-specified text, and the one or more processor are configured to:

obtain the target text by the model; and train the model based on the target text and the marker of the target text.

11. A non-transitory computer readable storage medium having computer instructions stored thereon, wherein a method for generating a text based on a semantic representation is implemented when the computer instructions are executed by a computer, and the method comprises:

obtaining an input text, the input text comprising a source text;

obtaining a placeholder of an $i^{th}$ word to be predicted in a target text, i representing a positive integer and the placeholder being a marker;

obtaining a vector representation of the $i^{th}$ word to be predicted, wherein the vector representation of the $i^{th}$ word to be predicted is obtained by inputting the placeholder of the $i^{th}$ word to be predicted, the source text and $1^{st}$ to $(i-1)^{th}$ predicted words into a self-attention unit in a model; and generating an $i^{th}$ predicted word based on the vector representation of the $i^{th}$ word to be predicted, to obtain a target text;

wherein the method further comprises:

determining a word to be replaced from the $1^{st}$ to the $(i-1)^{th}$ predicted words; and replacing the word to be replaced with a word in the semantic word list, in which, a co-occurrence probability of the word in the semantic word list with a previous predicted word of the word to be replaced is higher than a preset probability.

12. The non-transitory computer readable storage medium of claim 11, wherein the method comprises: replacing one or more of the $1^{st}$ to $(i-1)^{th}$ predicted words.

13. The non-transitory computer readable storage medium of claim 12, wherein replacing one or more of the $1^{st}$ to $(i-1)^{th}$ predicted words comprises:

replacing one or more of the $1^{st}$ to $(i-1)^{th}$ predicted words based on a semantic word list.

14. The non-transitory computer readable storage medium of claim 11, wherein parameters of a pre-training model are obtained based on the method for generating the text, and the parameters are taken as initialization parameters of the pre-training model during fine adjustment.

15. The non-transitory computer readable storage medium of claim 11, wherein the target text is composed of the $1^{st}$ to $i^{th}$ predicted words and has a marker being a pre-specified text, and the method further comprises:

obtaining the target text by the model; and training the model based on the target text and the marker of the target text.

* * * * *